United States Patent [19]

Shekleton

[11] Patent Number: 5,129,224
[45] Date of Patent: Jul. 14, 1992

[54] COOLING OF TURBINE NOZZLE CONTAINMENT RING

[75] Inventor: Jack R. Shekleton, San Diego, Calif.

[73] Assignee: Sundstrand Corporation, Rockford, Ill.

[21] Appl. No.: 447,598

[22] Filed: Dec. 8, 1989

[51] Int. Cl.⁵ ............................ F02C 1/00; F03B 11/00
[52] U.S. Cl. .................................. 60/39.36; 60/39.75; 415/115
[58] Field of Search ............................ 60/39.36, 39.75; 416/97 R; 415/115

[56] References Cited

U.S. PATENT DOCUMENTS

| | | | |
|---|---|---|---|
| 2,149,510 | 3/1939 | Darrieus | 416/90 R |
| 2,924,937 | 2/1960 | Leibach | 60/39.36 |
| 3,623,318 | 11/1971 | Shank | 60/39.36 |
| 3,937,013 | 2/1976 | Aspinwall | 60/39.36 |
| 4,152,092 | 5/1979 | Swearingen | . |
| 4,162,136 | 7/1979 | Parkes | 416/97 R |
| 4,311,431 | 1/1982 | Barbeau | . |

FOREIGN PATENT DOCUMENTS 1245218 7/1967 Fed. Rep. of Germany ...... 416/183

Primary Examiner—Richard A. Bertsch
Assistant Examiner—Timothy S. Thorpe
Attorney, Agent, or Firm—Wood, Phillips, Mason, Recktenwald & VanSanten

[57] ABSTRACT

Inexpensive cooling of a gas turbine nozzle and shroud assembly (62, 66, 76) is obtained by locating cooling air passages (84) in the vanes (76) forming part of the nozzle structure (62, 66, 76) so as to allow cooling air to flow between the shrouds (62 and 66).

10 Claims, 1 Drawing Sheet

COOLING OF TURBINE NOZZLE CONTAINMENT RING

FIELD OF THE INVENTION

This invention relates to gas turbines that operate on gases of combustion and, more specifically, to the cooling of the nozzle used in such turbines for directing the gases of combustion against a turbine wheel so that it may additionally serve a containment function.

BACKGROUND OF THE INVENTION

One substantial impediment to achieving high thermal efficiency in gas turbines resides in the inability of certain components, most notably the turbine wheel, turbine wheel vanes and turbine nozzle, to operate reliably and with long life at the high temperatures required to obtain high degrees of thermal efficiency. One means of overcoming the difficulty is to employ relatively exotic materials in the manufacture of these components, that is, use materials that are capable of withstanding the high temperatures as well as the thermal cycling associated with operation of the turbine. This solution, however, is an expensive one and is accordingly is not susceptible to use on a wide scale.

As an alternative, the art has preferred to seek improved schemes for cooling the components so that the same may be exposed to gases at ever increasing temperatures but without being heated to those temperatures themselves. Not infrequently, various means of distributing compressed air from the compressor of the engine to the components requiring cooling by means of various passages have been employed. All too frequently, however, the passages may be tortuous or large in number in relation to the vanes employed and otherwise unduly complicated. Such passages may be very small, particularly in small turbines and hence prone to plug. In addition such small passages are costly to make.

The present invention is directed to the provision of simple but highly effective cooling means for turbine nozzles in the form of low cost, large coolant carrying passageways, and obtains the added benefit of allowing the nozzle to be used for turbine wheel containment.

SUMMARY OF THE INVENTION

It is the principal object of the invention to provide a new and improved gas turbine. More specifically, it is an object of the invention to provide a gas turbine with improved turbine nozzle cooling which is sufficiently effective to allow the nozzle to serve as containment for the turbine wheel, but simple in construction and therefore economical to construct.

An exemplary embodiment of the invention achieves the foregoing object in a gas turbine including a rotary compressor and a radial inflow turbine wheel mounted for rotation and coupled to the compressor. An annular nozzle and shroud structure surrounds the turbine wheel and includes an annular, generally radially extending front shroud on one side of the turbine wheel, an annular radially and axially extending rear shroud on the opposite side of the turbine wheel and a plurality of vanes interposed between and supported by the shrouds radially outwardly of the turbine wheel. The vanes have leading edges remote from the turbine wheel and downstream edges oppositely thereof.

A combustor is provided for receiving compressed air from the compressor and fuel from a source, combusting the same and providing hot gases of combustion to the nozzle at the leading edges of the vanes. At least one passage is located in each such vane. Each passage opens at least to the rear shroud. Means are associated with the compressor for providing compressed air to the passages.

By means of this structure, the front and rear shrouds and the vanes are cooled by the flow of compressed air through the passages.

In a preferred embodiment of the invention, the means for providing compressed air includes openings in the front shroud which are in fluid communication with corresponding ones of the passages.

In a highly preferred embodiment, there is an annular diffuser disposed about the compressor and upstream of the combustor. The diffuser includes a generally radial wall adjacent, but spaced from, the front shroud to thereby define a plenum in fluid communication with the openings in the front shroud. An entrance to the plenum is provided and is in fluid communication with the compressor downstream of the diffuser and generally upstream of the combustor.

According to one embodiment of the invention, the passages include openings in the leading edge of the associated vane at about the midpoint of the associated vane.

In a preferred embodiment of the invention, the rear shroud terminates in a peripheral bulbous nose or lip that is located in the combustor and directed away from the nozzle. The passages open in the rear shroud at the bulbous nose.

In a highly preferred embodiment of the invention, the plenum extends about the combustor and includes an outlet between the combustor and the rear shroud adjacent the bulbous nose or lip so that air from the plenum flows over the bulbous nose and lip. This flow of air tends to draw cooling air through the passages.

According to still another aspect of the invention, there is provided a gas turbine which includes a rotary compressor with a radial inflow turbine wheel mounted for rotation and coupled to the compressor. An annular nozzle and shroud structure surrounds the turbine wheel and includes an annular, generally radially extending front shroud on one side of the turbine wheel and an annular, radially and axially extending rear shroud on the opposite side of the turbine wheel. A plurality of vanes are interposed between and supported by the shrouds radially outwardly of the turbine wheel and the vanes have leading edges remote from the turbine wheel and downstream edges oppositely thereof.

A combustor is provided for receiving compressed air from the compressor and fuel from a fuel source to combust the same and provides hot gases of combustion to the nozzle and shroud structure at the leading edges of the vanes. The combustor has an outlet at the nozzle and the rear shroud has a peripheral lip at the outlet which is directed generally axially away from the nozzle. An axial passage is located interiorly of each vane and each such passage terminates in an outlet located in the peripheral lip. Inlets are provided for each of the passages in the front shroud.

According to this aspect of the invention, air may pass from the front shroud through the vanes and ultimately out of the rear shroud to provide cooling for the nozzle and shroud structure. The cooling is sufficiently good that the temperature of the nozzle and stroud structure may be brought down to a level that can be readily withstood by materials of less than an exotic nature so that the structure may additionally serve as a containment structure for the turbine wheel, particularly where high angle vanes are utilized.

Other objects and advantages will become apparent from the following specification taken in connection with the accompanying drawings.

DESCRIPTION OF THE PREFERRED EMBODIMENTS

Figure 1:
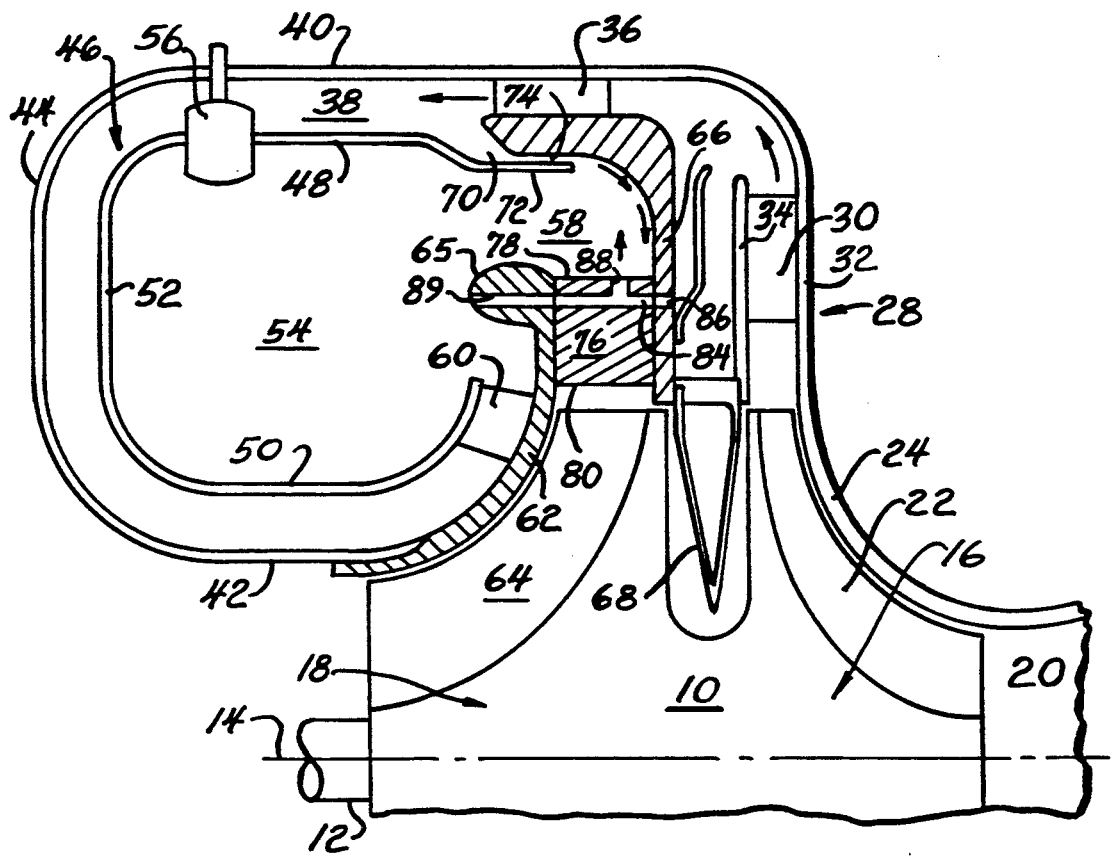
FIG. 1 is a fragmentary, sectional view of a gas turbine made according to the invention.

An exemplary embodiment of a gas turbine made according to the invention is illustrated in the drawings and with reference to FIG. 1 is seen to include a rotor, generally designated 10 associated with a rotary shaft 12 by which the rotor 10 may be mounted for rotation about an axis 14. The rotor 10 includes a compressor side 16 and a turbine wheel side 18. However, those skilled in the art will recognize that the compressor 16 and turbine wheel 18 may be totally separate entities if desired, although they will be mechanically coupled so that rotation of the turbine wheel 18 will ultimately drive the compressor 16.

The gas turbine includes an air inlet 20 adjacent to the compressor 16 and the latter includes blades 22 along with a compressor shroud 24 which is stationary. Compressed air exits the blades 22 in a generally radial direction to enter a conventional diffuser, generally designated 28. As is well known, the diffuser 28 will typically include stationary diffuser vanes 30 disposed between two generally radially extending walls 32 and 34.

The walls 32 and 34 take a bend and extend to an optional deswirler 36. The deswirler 36, if used, discharges into a compressed air plenum 38 that is annular about the axis 14. The plenum 38 includes a radially outer wall 40, a radially inner wall 42 and a radially extending wall 44 interconnecting the walls 40 and 42.

Within the plenum 38 is an annular combustor, generally designated 46. It includes a radially outer wall 48, a radially inner wall 50 and a radial wall 52 interconnecting the walls 48 and 50. Means are provided whereby compressed air from the plenum 38 may enter a combustion space 54 defined by the walls 48, 50 and 52 to be combusted with fuel injected therein by means of one or more injectors 56. The resulting gases of combustion leave the combustion space 54 via a combustor outlet 58.

The plenum 38 extends entirely about the combustor 46 and includes an outlet area 60 in the vicinity of the combustor outlet 58. Consequently, such compressed air does not enter the combustion space 54 for the purpose of supporting combustion, but passes about combustor 46 to enter as dilution air via the plenum outlet 60. In the course of flowing to the outlet 60, the compressed air comes in heat exchange relation with a rear shroud 62 for the vanes 64 on the turbine wheel 18. The rear shroud 62 is made of metal and requires cooling by reason of its exposure to the hot gases of combustion that are directed against the vanes 64 on the turbine wheel 18. As can be seen, the rear shroud 62 extends both radially and axially as the vanes 64 are disposed on the turbine wheel 18 so as to define a radial inflow turbine wheel.

The rear shroud terminates in a peripheral, bulbous nose or lip 65. The nose 65 is adjacent the outlet area 60 of the plenum 38 and is generally directed away from the nozzle vanes and in an axial direction. Stated another way, the nose 65 is directed toward the combustor 54 at a location adjacent to combustor outlet 58 and may have compressed air from the plenum 38 leaving the outlet area 60 flow over its surface toward the combustor outlet 58.

The nose 65 increases the length of the flow path of compressed air from the outlet area 60 to the nozzle defined by the nozzle vanes. Since this air is dilution air as mentioned previously, the length of the nose 65 or its peripheral surface is selected to provide a dilution air flow path of a length sufficient to obtain the desired degree of mixing of such dilution air with the products of combustion before they impinge upon the nozzle vanes.

Spaced from the wall 34 in the direction of the combustor 46 is an annular, metal, front shroud 66 which mounts a seal plate structure 68 for isolating the compressor 16 from the turbine 18. The front shroud 66 extends generally radially and then axially to join with the wall 48 of the combustor 46. It will be noted that the axial extension 70 of the front shroud 66 is located radially outward of an axial extension 72 of the wall 48 so as to define a peripheral, annular inlet 74 for cooling air to be directed against the front shroud 66.

Extending between the rear shroud 62 and the front shroud 66 at a location just radially outward of the turbine wheel 16 are a plurality of vanes 76. The vanes 76 together with the shrouds 62 and 66 define a nozzle and shroud structure whereby hot gases of combustion from the combustor 46 exit the outlet 58 thereof to impinge upon the leading edges 78 of the vanes 76. That is to say, the leading edges 78 are remote from the turbine wheel 64 whereas downstream or trailing edges 80 of the vanes 76 are adjacent the turbine wheel 18. Typically, the vanes will be high angle vanes, being angled as much as 60 degrees to a radius of the machine.

Figure 2:
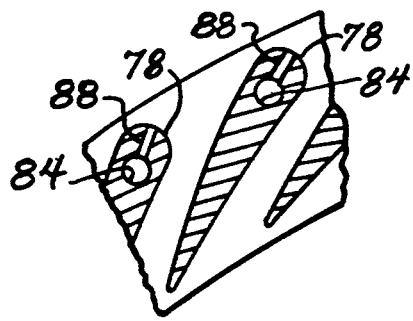
FIG. 2 is an enlarged, fragmentary sectional view taken approximately along the line 2—2 in FIG. 1.

In the embodiment illustrated in FIGS. 1 and 2, each vane 76 is provided with an axial passage 84 that extends inwardly and interiorly through the corresponding vane 76, the extension being from the front shroud 66. The front shroud 66 is provided with openings 86 which align with the passages 84 and which are in fluid communication with the compressor.

Each vane 76 also includes a bore 88 generally centrally of its length that has a radial component and which opens to the leading edge 78 of the corresponding vane 76.

Consequently, compressed air from the compressor ultimately is directed through the passages 84, 88 in each vane 76 to emerge generally centrally thereof to cool that part of each vane 76 that is farthest from the shrouds 62, 66 and therefore less able to be cooled by conduction.

The passages 84 extend through the associated vanes 76 to be in fluid communication with aligned openings 89 in the shroud which are located in the nose or lip 65 thereof. Thus, air flow may occur from the front shroud through the vanes and through the rear shroud to provide cooling for the front shroud, the vanes and the rear shroud as well. Note that the openings 89 are in the axial direction so as to open at an angle to the direction of air flow of dilution air emanating from the outlet area 60.

As a consequence of this, and the fact that such air may be accelerated somewhat as it leaves the outlet area 60 and impinges against the bulbous nose 65, a lower pressure area may be formed which serves to educt air out of the openings 86. That is to say, an eductor or venturi-like effect will come into existence to draw air through the passages 84 from the openings 86 in the front shroud 66.

Figure 3:
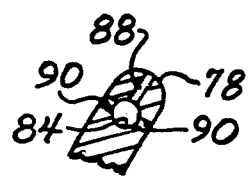
FIG. 3 is a fragmentary view of a modified embodiment of the invention.

In some instances, the openings 88 in the central areas of the vanes 76 may be dispensed with entirely. In other instances, and as shown in FIG. 3, they may be supplemented by passages 90 opening to one or both sides of the associated vanes 76 from the passages 84.

From the foregoing, it will be appreciated that a gas turbine according to the invention includes improved nozzle cooling of simple construction. As a consequence, improved operating efficiency can be obtained at minimal expense in a construction that utilizes relatively large cooling air passages that are not prone to plugging as may be the case with conventional art.

Moreover, the improved cooling of the front shroud 66, the rear shroud 62, and the vanes 76 provided by the invention will lower their temperatures during operation of the gas turbine to levels whereat relatively inexpensive materials may be utilized to form these components, and form them with sufficient strength that the shrouds and the vanes may serve as turbine wheel containment structure in the event of turbine wheel disintegration as is sometimes noted to occur in gas turbines. Effective containment will occur in most instances but will be particularly confining where high angles are utilized for the vanes 76.

When so used, the weight of the gas turbine is reduced which may be highly advantageous if the same is utilized to drive electrical or hydraulic components as in the case of an auxiliary power unit or an emergency unit aboard an aircraft; and, of course, the use of less exotic materials in making up the shrouds and vanes will reduce the cost of the system.

I claim:

1. A gas turbine comprising:
   a rotary compressor;
   a radial inflow turbine wheel mounted for rotation and coupled to said compressor;
   an annular nozzle and shroud structure surrounding said turbine wheel and including an annular, generally radially extending front shroud on one of said turbine wheel, an annular, radially and axially extending rear shroud on the opposite side of said turbine wheel and a plurality of vanes interposed between and supported by said shrouds radially outwardly of said turbine wheel, said vanes having leading edges remote from said turbine wheel and downstream edges opposite thereof;
   an annular combustor for receiving compressed air from said compressor and fuel from a source, combusting the same and providing hot gases of combustion through an outlet to said nozzle and shroud structure at the leading edges of said vanes;
   an annular plenum in fluid communication with said compressor and surrounding said combustor in spaced relation thereto to define, with said rear shroud, a flow path for compressed air thereabout and terminating in an outlet area adjacent to and in fluid communication with said nozzle and shroud structure for the compressed air to enter said combustor outlet as dilution air;
   at least one passage in each of said vane, each opposing at one end through the rear shroud to said flow path between said compressor and said outlet area; and
   means in fluid communication with said compressor for providing compressed air to each of said passages at a location spaced from said one end.

2. The gas turbine of claim 1 wherein said providing means includes openings in said front shroud in fluid communication with corresponding ones of said passages.

3. The gas turbine of claim 2 further including an annular diffuser disposed about said compressor and upstream of said combustor, and including a generally radial wall adjacent, but spaced from, said front shroud to thereby define a second plenum in fluid communication with said openings; and an entrance to said plenum in fluid communication with said compressor downstream of said diffuser and generally upstream of said combustor.

4. The gas turbine of claim 3 wherein at least some of said passages include openings in the leading edges of the associated vane about the midpoint of the associated vane.

5. The gas turbine of claim 3 wherein said rear shroud terminates in a bulbous nose in said combustor and said passages open in said rear shroud at said bulbous nose.

6. The gas turbine of claim 5 wherein said annular plenum outlet area is between said combustor and said rear shroud adjacent said bulbous nose whereby air from said plenum flowing over said bulbous nose draws air through said passage.

7. The gas turbine of claim 1 wherein said rear shroud terminates in a bulbous nose in said combustor and said passages open in said rear shroud at said bulbous nose.

8. A gas turbine comprising:
   a rotary compressor;
   a radial inflow turbine wheel mounted for rotation and coupled to said compressor;
   an annular nozzle and shroud structure surrounding said turbine wheel and including an annular, generally radially extending front shroud at one side of said turbine wheel, an annular, radially and axially extending rear shroud on the opposite side of said turbine wheel and a plurality of vanes interposed between and supported by said shrouds radially outwardly of said turbine wheel, said vanes having leading edges remote from said wheel and downstream edges oppositely thereof;
   an annular combustor for receiving compressed air from said compressor and fuel from a source, combusting the same and providing hot gases of combustion through an outlet to said nozzle and shroud structure at the leading edges of said vanes;
   an annular plenum in fluid communication with said compressor and surrounding said combustor in spaced relation thereto to define, with said rear shroud, a flow path for compressed air thereabout and terminating in an outlet area adjacent to and in fluid communication with said nozzle and shroud structure for the compressed air to enter said combustor outlet as dilution air;
   a passage in each said vane, each extending from the front shroud to open through said rear shroud to said annular plenum upstream of said outlet area; and means in said front shroud and in fluid communication with said compressor for providing air to said passages.

9. A gas turbine comprising:

a rotary compressor;

a radial inflow turbine wheel mounted for rotation and coupled to said compressor;

an annular nozzle and shroud structure surrounding said turbine wheel and including an annular, generally radially extending front shroud on one side of said turbine wheel, an annular, radially and axially extending rear shroud on the opposite side of said turbine wheel and a plurality of vanes interposed between and supported by said shrouds radially outwardly of said turbine wheel, said vanes having leading edges remote from said turbine wheel and downstream edges oppositely thereof;

a combustor for receiving compressed air from said compressor and fuel from a source, combusting the same and providing hot gases of combustion to said nozzle and shroud structure at the leading edges of said vanes, said combustor having an outlet to said nozzle;

said rear shroud having a peripheral lip at said outlet and directed generally axially away from said nozzle;

an axial passage interiorly of each said vane, each terminating in an outlet located in said peripheral lip; and inlets for each of said passages in said front shroud.

10. The gas turbine of claim 9 further including a plenum surrounding said combustor and in fluid communication with said compressor, said plenum having a compressed air outlet between said rear shroud and said combustor adjacent said lip for flowing compressed air over said lip to draw air through said passages.

* * * * *